US008728175B2

(12) United States Patent
Liao (10) Patent No.: US 8,728,175 B2
(45) Date of Patent: May 20, 2014

(54) MANUFACTURING METHOD OF A BATTERY

(75) Inventor: Chungpin Liao, Taichung (TW)

(73) Assignee: iNNOT BioEnergy Holding Co., George Town (KY)

( * ) Notice: Subject to any disclaimer, the term of this patent is extended or adjusted under 35 U.S.C. 154(b) by 561 days.

(21) Appl. No.: 13/075,960

(22) Filed: Mar. 30, 2011

(65) Prior Publication Data

US 2012/0144660 A1 Jun. 14, 2012

(30) Foreign Application Priority Data

Dec. 13, 2010 (CN) .......................... 2010 1 0585601

(51) Int. Cl.
| H01M 10/00 | (2006.01) |
| H01M 10/02 | (2006.01) |
| H01M 10/04 | (2006.01) |
| H01M 4/00 | (2006.01) |
| H01M 4/02 | (2006.01) |
| H01M 4/04 | (2006.01) |
| H01M 4/60 | (2006.01) |

(52) U.S. Cl.
USPC ......... 29/623.1; 29/623.5; 29/623.2; 429/212

(58) Field of Classification Search
USPC ............... 429/50–52, 96–100, 129–147, 429/247–255, 163–187, 188, 189, 301–347, 429/199–207, 208, 209–246; 29/623.1–623.5; 252/182.1, 184, 252/500–521.6, 62.2, 182
See application file for complete search history.

(56) References Cited

U.S. PATENT DOCUMENTS

| 4,251,607 A * | 2/1981 | Yamaki et al. ................ 429/338 |
| 6,511,774 B1 | 1/2003 | Tsukuda et al. |
| 6,905,798 B2 | 6/2005 | Tsukuda et al. |
| 7,405,172 B2 | 7/2008 | Shigematsu et al. |
| 2009/0325067 A1 | 12/2009 | Liao et al. |

FOREIGN PATENT DOCUMENTS

TW    I288495 B    10/2007

* cited by examiner

*Primary Examiner* — Basia Ridley
*Assistant Examiner* — Caitlin Wilmot
(74) *Attorney, Agent, or Firm* — Novak Druce Connolly Bove + Quigg LLP (57) ABSTRACT

An exemplary manufacturing method for a battery is provided in the present invention. The manufacturing method includes step S1: providing a high polymer solution; step S2: providing a negative-electrode structure; step S3: providing a separation structure; step S4: assembling the negative-electrode and the separation structure into a housing; and step S5: inserting a current collector into the housing and filling a positive-electrode material therein to form a positive-electrode structure. At least one of the negative-electrode structure and the positive-electrode structure comprise chlorophyll. Thus, the manufacturing process of the battery is simple, and economical, and natural and non-toxic substances are used. Unlike the manufacturing process of conventional batteries, the battery manufactured according to embodiments of the present invention will not cause environmental pollution even when it is discarded after being used.

20 Claims, 7 Drawing Sheets

MANUFACTURING METHOD OF A BATTERY

CROSS-REFERENCE TO RELATED APPLICATION

This application claims priority of Chinese Patent Application No. 201010585601.5, filed on Dec. 13, 2010, entitled "Manufacturing Method Of A Battery" by Chungpin Liao, the disclosure of which is incorporated herein by reference in its entirety.

FIELD OF THE INVENTION

The present invention relates to a manufacturing method of a battery, and more particularly to a battery using chlorophyll to generate electricity and a manufacturing method thereof.

BACKGROUND OF THE INVENTION

In recent years, portable electronic devices, such as mobile phones, portable cameras, notebook computers, digital cameras, personal digital assistants (PDAs), CD players, are becoming popular owing to their lightweight and small size. Batteries used as a portable power source have also become the focus of the public concern, and have been an essential element of various portable electronic devices.

Although common batteries, such as carbon-zinc batteries, alkaline batteries and secondary batteries, are allegedly environment-benign, they in fact largely contain substantial amounts of mercury and other heavy metals, such as cobalt. Other than that, environmental pollutants are frequently used or released during battery manufacturing processes.

Lithium batteries, though widely adopted as the largest energy content among the portable batteries, are unstable in the electrochemical reactions. In the worst scenarios, explosions can occur due to its thermal runaway as the result of operating at low load or under improper assemblage. Therefore, multiple and complex protection mechanisms should be implemented for their usage, such as the installation of a protection circuit, an exhaust vent, and isolation membranes, etc.

The price of the lithium batteries rises rapidly as a result of the depletion of lithium mineral, which is the main raw material of the positive electrode (such as $Li_{1-x}CoO_2$) and the negative electrode (such as $Li_xC$) of lithium batteries. Furthermore, the performance and operating life of the lithium batteries decrease rapidly within a high temperature environment.

Therefore, an unaddressed need for a battery using chlorophyll to generate electricity exists in the art to address the aforementioned deficiencies and inadequacies.

SUMMARY OF THE INVENTION

The present invention provides a manufacturing method of a battery. The method uses chlorophyll to generate electricity that can avoid the problems encountered with conventional batteries. The advantages of the present invention will be understood more readily after a consideration of the drawings and the detailed description of the preferred embodiments.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

Reference will now be made to the drawings to describe an exemplary embodiment in detail.

Figure 1:
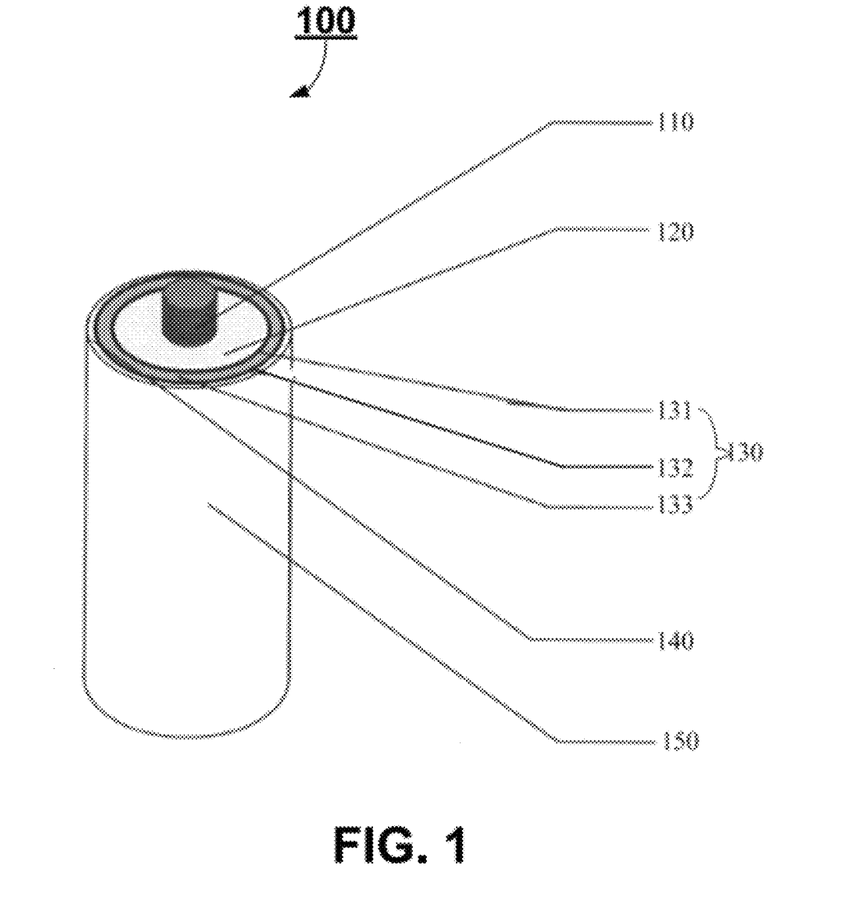
FIG. 1 is a perspective view of a battery according to an exemplary embodiment of the present invention.

FIG. 1 is a perspective view of a battery 100 according to one exemplary embodiment of the present invention. As shown in FIG. 1, the battery 100 of the exemplary embodiment includes a current collector 110, a positive-electrode structure 120, a separation structure 130, a negative-electrode structure 140 and a housing 150. The positive-electrode structure 120, the separation structure 130, the negative-electrode structure 140 and the housing 150 are encircled around the current collector 110 in sequence.

Figure 2:
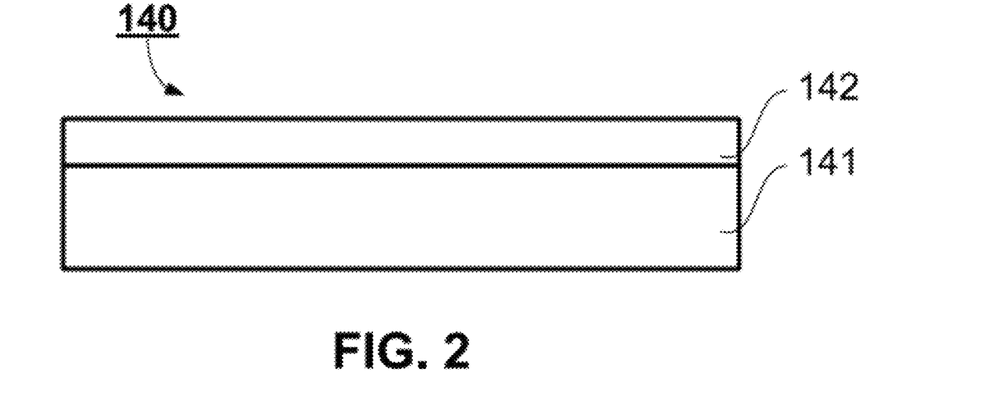
FIG. 2 is a sectional view of a negative-electrode structure in according to an exemplary embodiment of the present invention.

FIG. 2 is a sectional view of the negative-electrode structure 140 according to an exemplary embodiment of the present invention. As shown in FIG. 2, the negative-electrode structure 140 of the exemplary embodiment includes a conductive layer 141 and a negative-electrode layer 142, and the negative-electrode layer 142 is formed on the conductive layer 141.

The conductive layer 141 is made of a conductive material. The conductive material can be metal, metallic compound, or conductive polymeric material. The metal can be selected from the group consisting of aluminum and gold. The metallic compound can be selected from the group consisting of manganese protoxide, zinc oxide and magnesium oxide. The conductive polymeric material can be selected from the group consisting of heterocycle or aromatic heterocyclic compound. Preferably, the conductive polymeric material can be selected from the group consisting of polyacetylene, poly (arylene vinylene), polythiophene, polyaniline, polypyrrole and the derivatives thereof.

The negative-electrode layer 142 includes chlorophyll and high polymer solution, and the negative-electrode layer 142 is formed on the conductive layer 141 by a coating method, etc. The chlorophyll is selected from the group consisting of chlorophyll a, chlorophyll b, chlorophyll c1, chlorophyll c2, chlorophyll d, and chlorophyll e. Typically, the chlorophyll, from which the chlorophyll oxidase have been removed, can be in powder form or in liquid form.

The high polymer solution is adhesive and configured for adhering and adjusting the physical and chemical characteristics of the conductive layer, such that the negative-electrode layer 142 can properly adhere to the conductive layer 141. In addition, the electric conductivity of the high polymer solution is within a range of 50 ms/cm to 250 ms/cm. The high polymer solution includes elements selected from the group consisting of boron, magnesium, aluminum, calcium, manganese and zinc. The high polymer solution is further configured for adjusting the work function of the conductive layer 141, so as to achieve the desired potential difference, such as 1.5V, between the positive-electrode structure and the negative-electrode structure of the battery 100.

The high polymer solution is prepared from compound of metal ions and acid ions, high polymer and solvent in proportion, and each is with a concentration from 0.1 mol/L to 10 mol/L. The high polymer includes high polymer of glucose. The high polymer of glucose can be plant starch, such as potato starch, water chestnut starch, corn starch, sweet potato starch, lotus root starch, mustard powder, and pueraria powder, etc. The compound of metal ions and acid ions can be calcium carbonate. Alternatively, the compound of metal ions and acid ions can be natural phytochemicals, including lignans, oligosaccharides, polysaccharides, flavonoids, iridoids, fatty acids, scopoletin, catechin, beta-sitosterol, damnacanthal, and alkaloids. The solvent can have a polarity and a PH value thereof greater than 3, such as water, seawater, tea, coffee, fruit juice or liquor, etc. The PH value of the high polymer solution is between about 5.5 to about 8. The high polymer solution can further comprise vitamin, such as vitamin D.

The negative-electrode structure 140 is made into a membrane to increase the usage rate of the chlorophyll and enlarge the contact area thereof so as to increase the response area of the battery, etc. In addition, it should be understood for a person skilled in the art that, any known method can be used to increase the usage rate of the chlorophyll and enlarge the contact area thereof to increase the response area of the battery, etc. Preferably, in the exemplary embodiment, the length of the negative-electrode structure 140 is about 60 mm, and the width thereof is about 50 mm.

Referring to FIG. 1 again, the following will continue to introduce other structures of the battery 100 of the present invention. The current collector 110 is in a cylinder shape. Preferably, the diameter of the current collector 110 is about 4 mm, and the length is about 47.2 mm.

The positive-electrode structure 120 is made of positive-electrode material in powder form. Preferably, the positive-electrode material in powder form can comprise the chlorophyll in powder form. In addition, the positive-electrode material powder can further contain carbon fiber cloth, carbon powder or nano conductive polymeric powder. The carbon fiber cloth or the carbon powder can be selected from the group consisting of hard charcoal (or called chaoite), soot carbon, glassy carbon, carbon nanotube, activated carbon, diamond, amorphous carbon, grapheme, fullerene, graphite, carbyne, diatomic carbon, tricarbon, atomic carbon, graphitization carbon, thermolabile carbon, coke, or other allotropes of carbon. The material of the conductive polymeric powder can be selected from the group consisting of heterocycle or aromatic heterocyclic compound. Preferably, the material of the conductive polymeric powder can be selected from the group consisting of polyacetylene, poly (arylene vinylene), polythiophene, polyaniline, polypyrrole and the derivatives thereof.

The separation structure 130 has a first separator 131, a second separator 132 and electrolyte material 133 sandwiched between the two separators. The first separator 131 and the second separator 132 are both made of high-fiber material, and the high-fiber material can be paper material, such as cellophane, cotton paper, rice paper or silk paper, etc. Furthermore, the high-fiber material has pores therein, and the diametric length of each pores is preferably between about 0.01 μm to about 1 cm. In addition, in the exemplary embodiment, the first separator 131 and the second separator 132 are both membranes, and the lengths of these two membranes are about 55 mm, their width is about 50 mm and their thickness is about 0.2 mm. The electrolyte material 133 can be a solution of organic salt or a solution of organic salt and chlorophyll. The electric conductivity of the solution should be between about 10 ms/cm to about 500 ms/cm. The organic salt can be organic salt without lithium, and selected from the group consisting of sodium iodide, sodium chloride and sodium hydroxide.

The housing 150 can be a paper tube with its outer diameter being about 14.5 mm, its inner diameter being about 12.5 mm, and its length being about 48.4 mm. The housing 150 is configured for containing the current collector 110, the positive-electrode structure 120, the separation structure 130 and the negative-electrode structure 140.

In the exemplary embodiment, both of the negative-electrode structure 140 and the positive-electrode structure 120 comprises the chlorophyll. Thus, when the battery 100 operates, the chlorophyll of the negative-electrode structure 140 and the chlorophyll of the positive-electrode structure 120 generate electrons or holes as they receive light or touch the electrolyte solution, such that a potential difference occurs between the positive-electrode structure 120 and the negative-electrode structure 140 to supply a continuous current. In other words, the battery 100 of the present invention uses chlorophyll as the energy source to generate electricity. Preferably, the chlorophyll of the negative-electrode structure 140 and the chlorophyll of the positive-electrode structure 120 have different work functions with each other.

Although both of the negative-electrode structure 140 and the positive-electrode structure 120 contain the chlorophyll in the exemplary embodiment, it should be understood for a person skilled in the art that, the battery of the present invention can only use the chlorophyll in the negative-electrode structure 140, or only use the chlorophyll in the positive-electrode structure 120, to use the chlorophyll as the energy source such that the battery can provide the electrical energy.

Figure 3:
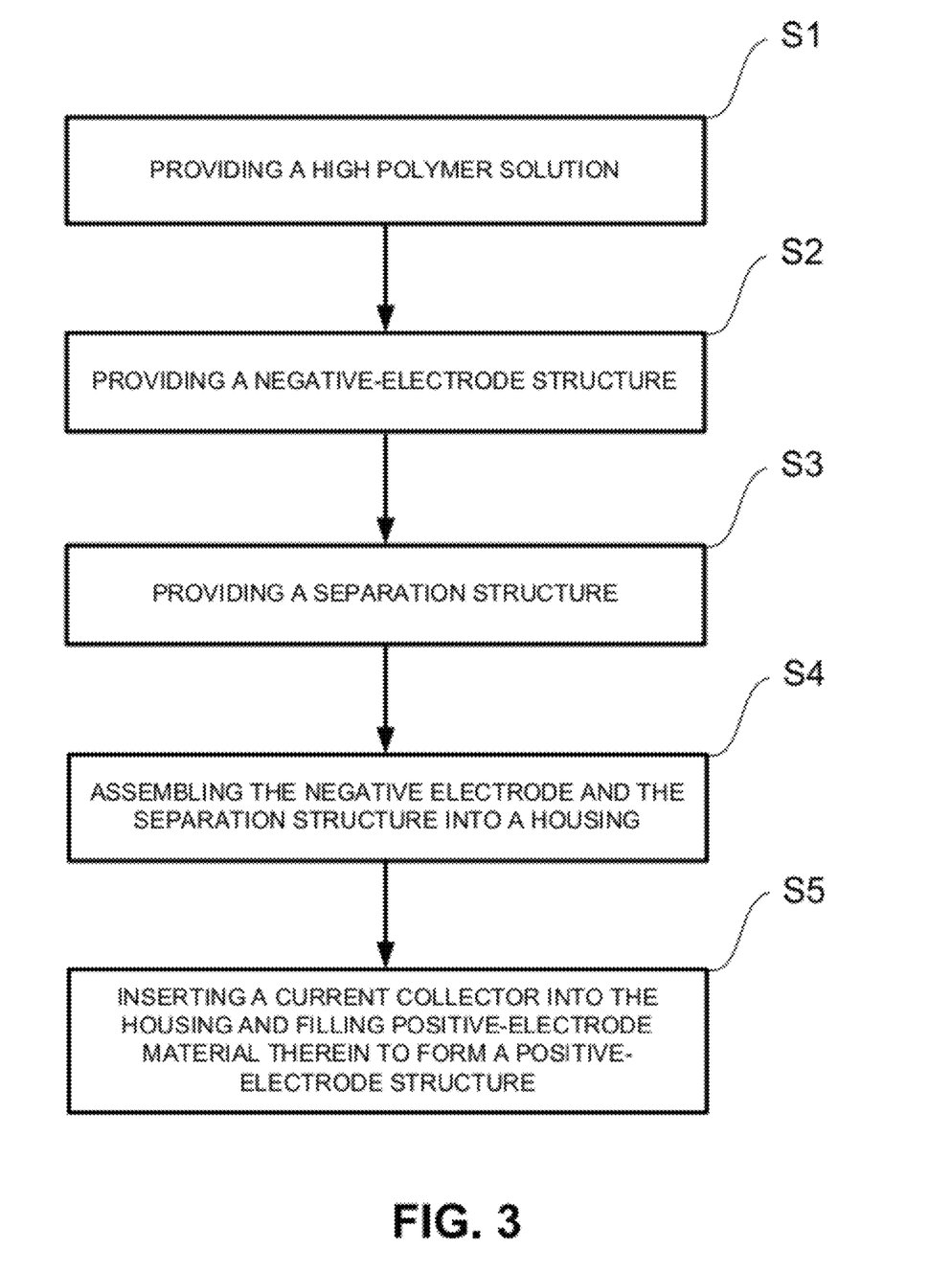
FIG. 3 is a flow chart of a manufacturing method of a battery according to an exemplary embodiment of the present invention.

FIG. 3 is a flow chart of a manufacturing method for battery according to an exemplary embodiment of the present invention. As shown in FIG. 3, the manufacturing method includes following steps:

Step S1: manufacturing a high polymer solution;
Step S2: manufacturing a negative-electrode structure;
Step S3: manufacturing a separation structure;
Step S4: assembling the negative-electrode structure and the separation structure into a housing; and
Step S5: inserting a current collector into the housing and filling a positive-electrode material therein to form a positive-electrode structure.

Figure 4:
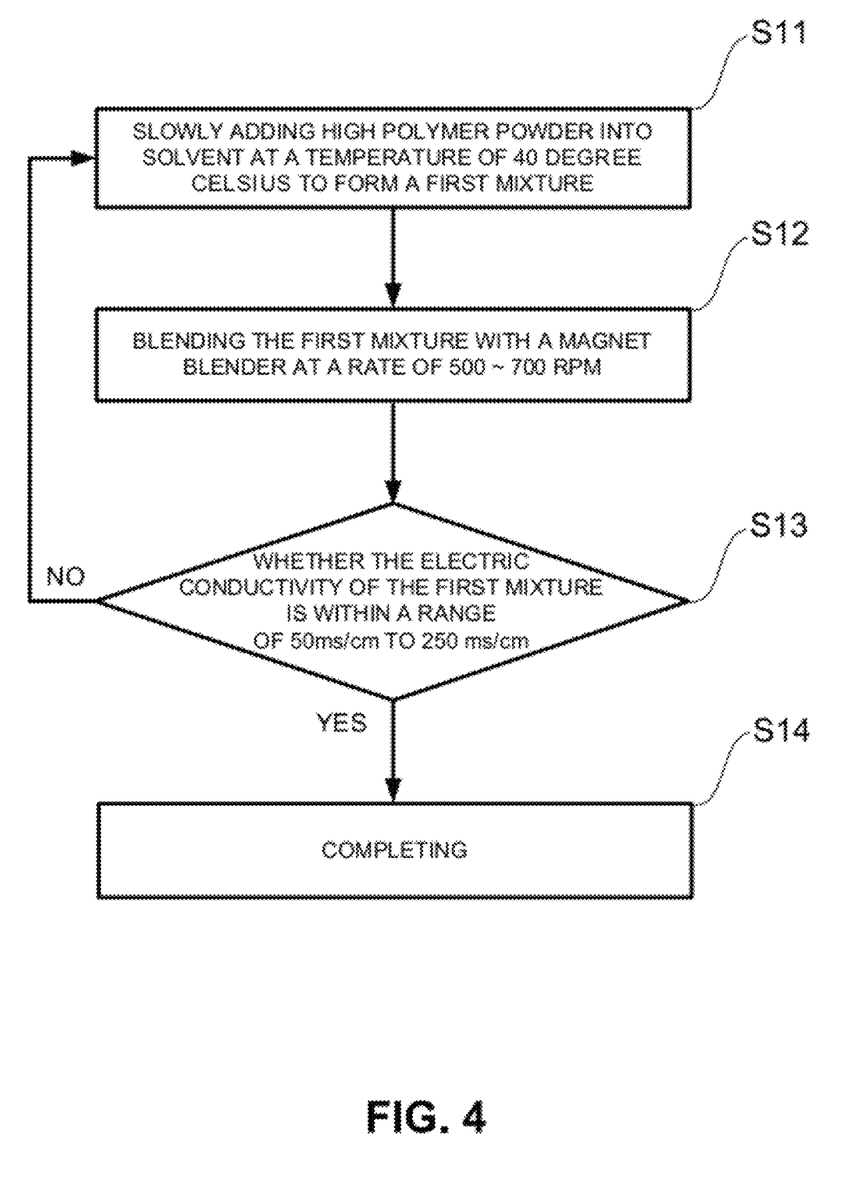
FIG. 4 is a detailed flow chart of the step S1 as shown in FIG. 3.

FIG. 4 is a detailed flow chart of the step S1 as shown in FIG. 3. As shown in FIG. 4, the step S1 of providing a high polymer solution includes following steps:

Step S11: slowly adding high polymer powder into solvent with a temperature of 40 Degree Celsius to form a first mixture;
Step S12: blending the first mixture with a magnet blender at a rate of 500~700 RPM;
Step S13: detecting whether the electric conductivity of the first mixture is within a range of 50 ms/cm to 250 ms/cm or not; if a result thereof is no, returning to perform the step S11; and if the result thereof is yes, performing a step S14; and
Step S14: completing.

In the exemplary embodiment, the solvent can have a polarity and a PH value greater than 3, such as water, seawater, tea, coffee, fruit juice or liquor, etc.

Figure 5:
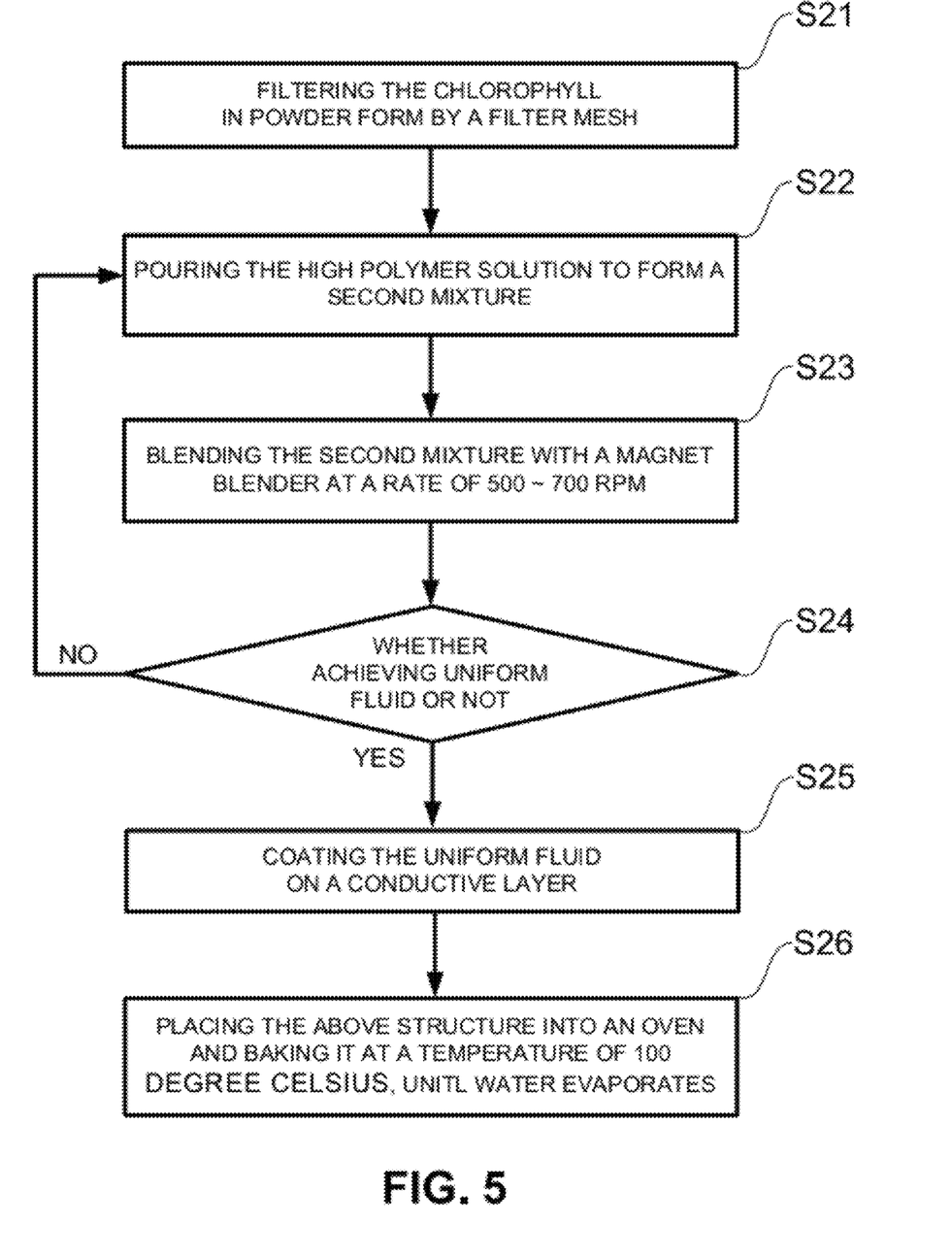
FIG. 5 is a detailed flow chart of the step S2 as shown in FIG. 3.

FIG. 5 is a detailed flow chart of the step S2 as shown in FIG. 3. In FIG. 5, the step S2 of providing a negative-electrode structure comprises the following steps:

Step S21: filtering the chlorophyll in powder form by a filter mesh;

Step S22: pouring the chlorophyll into the high polymer solution to form a second mixture;

Step S23: blending the second mixture with a magnet blender at a rate of 500~700 RPM;

Step S24: judging whether uniform fluid is achieved; if the answer is no, returning to perform the step S22; and if the answer is yes, performing the step S25;

Step S25: coating the uniform fluid on a conductive layer;

Step S26: placing the conductive layer into an oven and baking it at a temperature of 100 Degree Celsius, until water evaporates.

Figure 6:
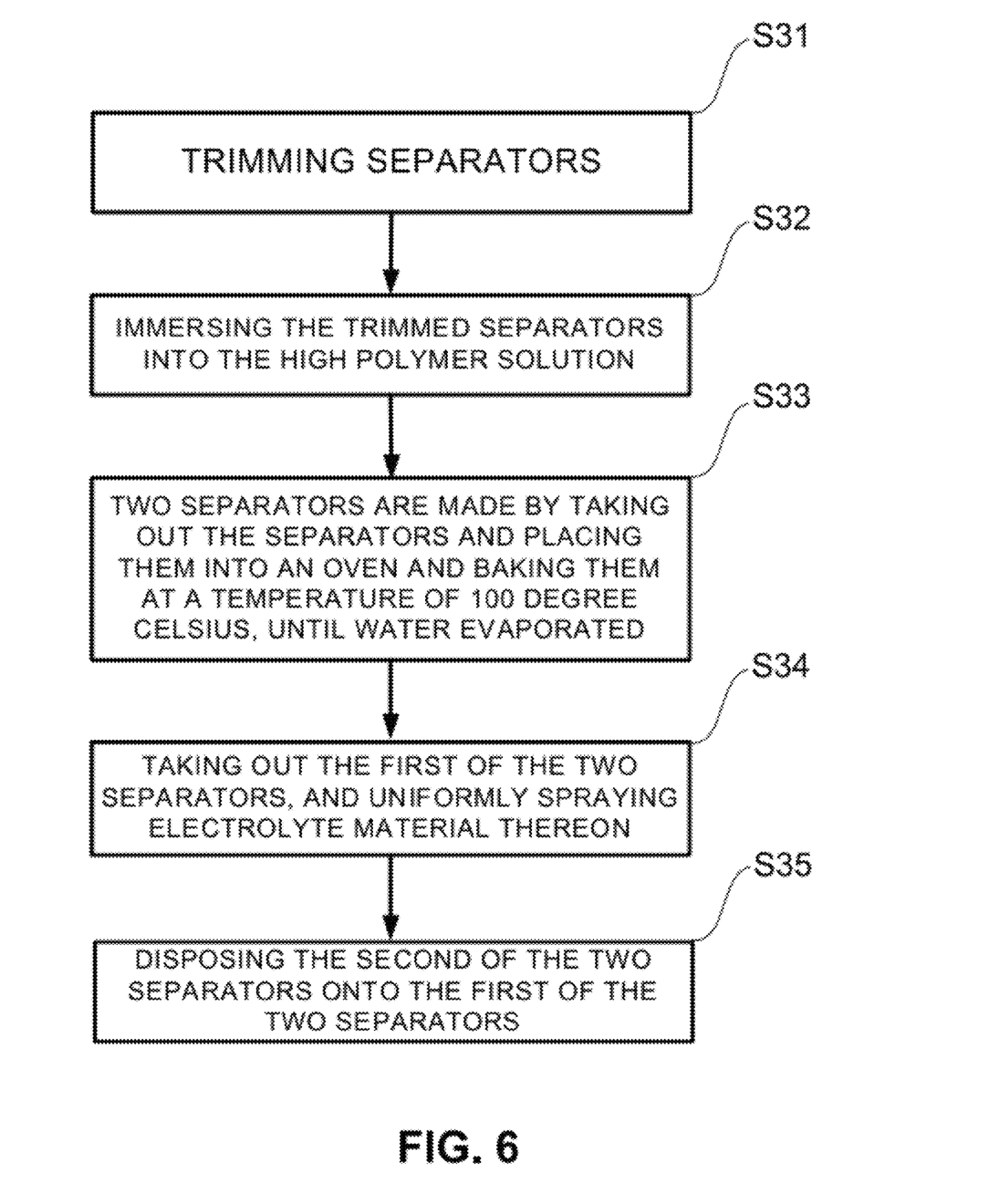
FIG. 6 is a detailed flow chart of the step S3 as shown in FIG. 3.

FIG. 6 is a detailed flow chart of the step S3 as shown in FIG. 3. In FIG. 6, the step of providing a separation structure includes following steps:

Step S31: trimming the separators;

Step S32: immersing the trimmed separators into a high polymer solution;

Step S33: two separators are made by taking out two separators and placing them into an oven and baking them at a temperature of 100 Degree Celsius, until water;

Step S34: taking out the first of the two separators, and uniformly spraying electrolyte material thereon; and Step S35: covering the second of the two separators on the electrolyte material, to complete the whole processes of manufacturing the separation structure.

Figure 7:
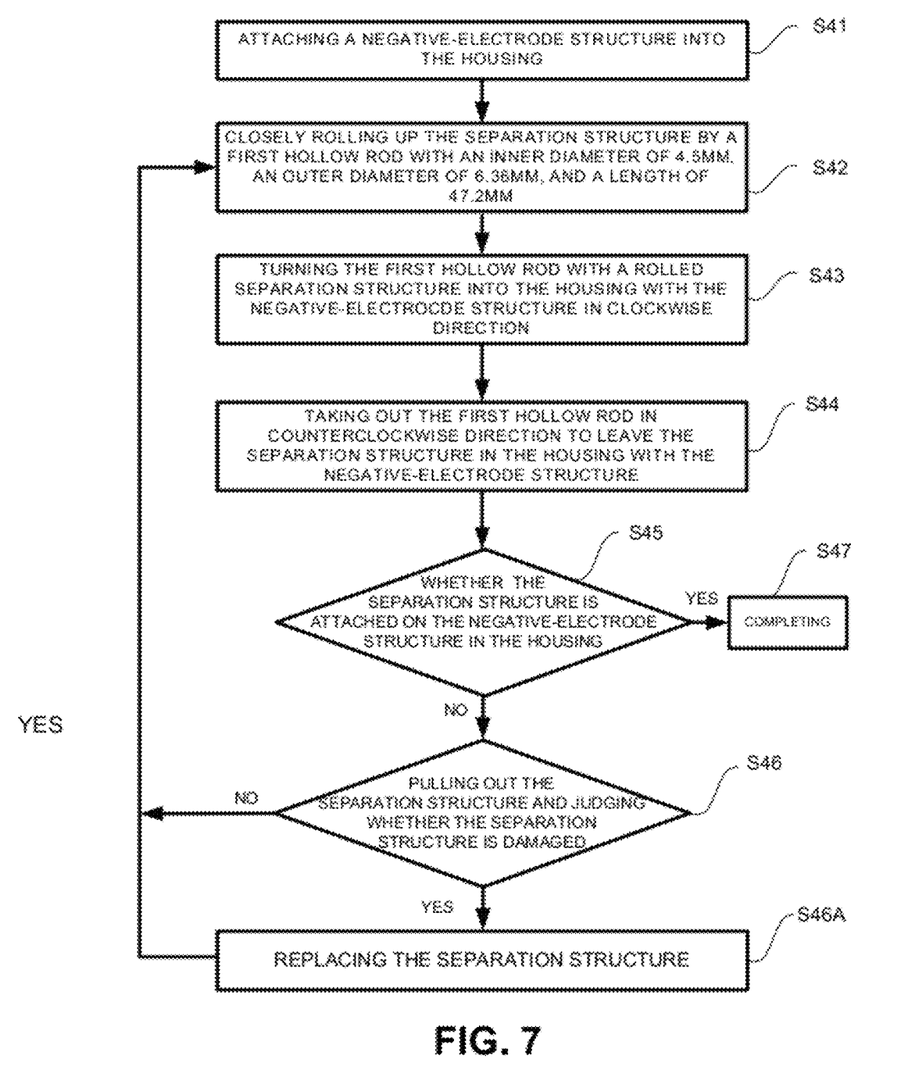
FIG. 7 is a detailed flow chart of the step S4 as shown in FIG. 3.

FIG. 7 is a detailed flow chart of the step S4 as shown in FIG. 3. In FIG. 7, the step S4 of assembling the negative-electrode structure and the separation structure into the housing, includes following steps:

Step S41: attaching the negative-electrode structure into the housing;

Step S42: closely rolling up the separation structure by a first hollow rod, having an inner diameter of 4.5 mm, an outer diameter of 6.36 mm, and a length of 47.2 mm;

Step S43: turning the first hollow rod with the rolled separation structure into the housing with the negative-electrode structure in clockwise direction;

Step S44: taking out the first hollow rod in counterclockwise direction to leave the separation structure in the housing, with the negative-electrode structure;

Step S45: detecting whether the separation structure is attached on the negative-electrode structure in the housing; if the answer is no, performing the step S46; and if the answer is yes, performing the step S47;

Step S46: pulling out the separation structure and judging whether the separation structure is damaged or not; if the answer is no, returning to perform the step S42; and if the answer is yes, performing the step S46a;

Step S46a: replacing the separation structure and returning to perform the step S42; and Step S47: completing.

Figure 8:
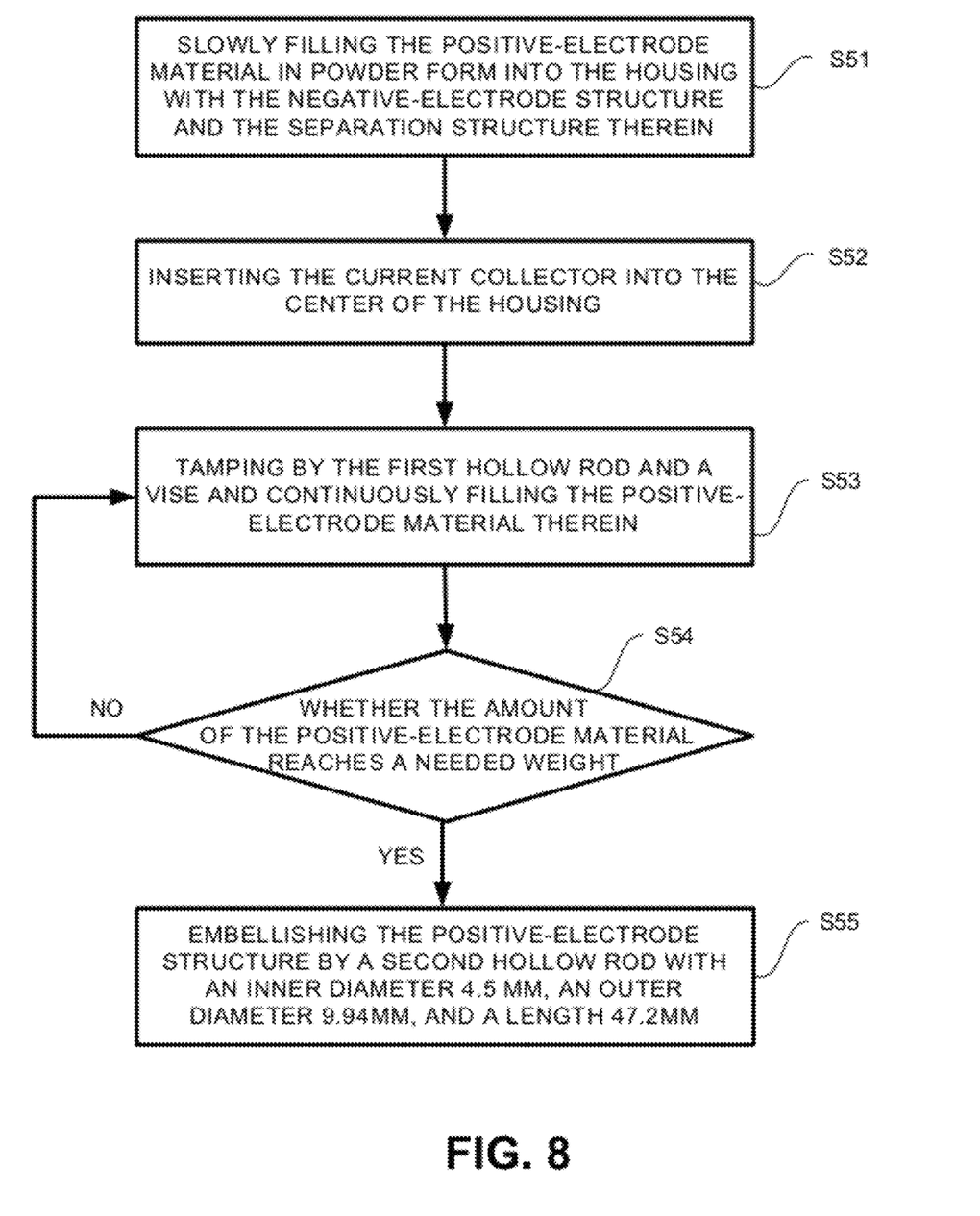
FIG. 8 is a detailed flow chart of the step S5 as shown in FIG. 3.

FIG. 8 is a detailed flow chart of the step S5 as shown in FIG. 3. In FIG. 8, the step S5 of inserting the current collector into the housing and filling the positive-electrode material therein to form the positive-electrode structure includes following steps:

Step S51: slowly filling the positive-electrode material in powder form into the housing with the negative-electrode structure and the separation structure;

Step S52: inserting the current collector into the center of the housing;

Step S53: tamping by the first hollow rod and a vise and continuously filling the positive-electrode material therein;

Step S54: detecting whether the amount of the positive-electrode material reaches a needed weight; if the answer is no, returning to perform the step S53; and if the answer is yes, performing a step S55; and Step S55: embellishing the positive-electrode structure by a second hollow rod, having an inner diameter of 4.5 mm, an outer diameter of 9.94 mm, and a length of 47.2 to form the positive-electrode structure.

The battery of the present invention could store hydrogen by the chlorophyll of the positive-electrode structure and/or the negative-electrode structure to generate electricity. Preferably, both of the positive-electrode structure and the negative-electrode structure contain chlorophyll, but they have different work-functions. Namely, during the oxidation-reduction chemical reaction, the chlorophyll molecule would lose a magnesium ion in its porphyrin center to become the pheophytin molecule. Two empty bonding sites of the latter then trap two hydrogen ions to practically store hydrogen and make the running of current smooth. In addition, not only is the manufacturing process of the battery simple and economical, but also natural, non-toxic substances are used. Unlike the conventional batteries, the battery of the present invention will not cause environmental pollution even when discarding after use.

It should be noted that the terms "first", "second", "third" and other terms in the present invention are only used as textual symbols as the circumstances can require, and thus the practice is not limited to these terms. It should be further noted that these terms can be used interchangeably.

While there has been shown several and alternate embodiments of the present invention, it is to be understood that certain changes can be made as would be known to one skilled in the art without departing from the underlying scope of the present invention as is discussed and set forth above and below including claims. Furthermore, the embodiments described above and claims set forth below are only intended to illustrate the principles of the present invention and are not intended to limit the scope of the present invention to the disclosed elements.

What is claimed is:

1. A manufacturing method of a battery, comprising:
    step S1: providing a high polymer solution;
    step S2: providing a negative-electrode structure;
    step S3: providing a separation structure;
    step S4: assembling the negative-electrode and the separation structure into a housing; and
    step S5: inserting a current collector into the housing and filling positive-electrode material therein to form a positive-electrode structure, wherein both the negative-electrode structure and the positive-electrode structure comprise chlorophyll.

2. The manufacturing method of claim 1, wherein the step S1 further comprises following steps:
    step S11: slowly adding high polymer powder into solvent at a temperature of 40 degree Celsius to form a first mixture;
    step S12: blending the first mixture with a magnet blender at a rate of 500~700 RPM;
    step S13: detecting whether its electric conductivity of the first mixture is within a range of about 50 ms/cm to about 250 ms/cm; if the answer is no, returning to the step S11.

3. The manufacturing method of claim 2, wherein the high polymer powder comprises compound of metal ions and acid ions, and high polymer, such that the high polymer solution comprises the compound of metal ions and acid ions, the high polymer and the solvent, and each thereof has a concentration of about 0.1 mol/L to about 10 mol/L.

4. The manufacturing method of claim 3, wherein the high polymer comprises high polymer of glucose, and the high polymer of glucose is selected from the group consisting of potato starch, water chestnut starch, corn starch, sweet potato starch, lotus root starch, mustard powder and pueraria powder.

5. The manufacturing method of claim 3, wherein the compound of metal ions and acid ions comprises calcium carbonate or natural phytochemicals selected from the group consisting of lignans, oligosaccharides, polysaccharides, flavonoids, iridoids, fatty acids, scopoletin, catechin, beta-sitosterol, damnacanthal and alkaloids.

6. The manufacturing method of claim 3, wherein the solvent has a polarity and a PH value greater than 3, and it is selected from the group consisting of water, seawater, tea, coffee, fruit juice and liquor.

7. The manufacturing method of claim 3, wherein a PH value of the high polymer solution is within a range of about 5.5 to about 8, and its electric conductivity is within the range of about 50 ms/cm to about 250 ms/cm.

8. The manufacturing method of claim 2, wherein the step S2 further comprises following steps:
   step S21: filtering the chlorophyll in powder form by a filter mesh;
   step S22: pouring the high polymer solution to form a second mixture;
   step S23: blending the second mixture with the magnet blender at a rate of 500~700 RPM;
   step S24: judging whether uniform fluid is achieved; if the answer is no, returning to the step S22; and if the answer is yes, go to the step S25;
   step S25: coating the uniform fluid on a conductive layer;
   step S26: placing the above structure into an oven and baking it at a temperature of 100 degree Celsius, until water evaporates.

9. The manufacturing method of claim 8, wherein the conductive layer comprises conductive material, and the conductive material is selected from the group consisting of metal, metallic compound and conductive polymeric material.

10. The manufacturing method of claim 9, wherein the metal is selected from the group consisting of aluminum and gold, the metallic compound is selected from the group consisting of manganese protoxide, zinc oxide and magnesium oxide, and the conductive polymeric material is heterocycle or aromatic heterocyclic compound and selected from the group consisting of polyacetylene, poly (arylene vinylene), polythiophene, polyaniline, polypyrrole and their derivatives.

11. The manufacturing method of claim 8, wherein the chlorophyll is selected from the group consisting of chlorophyll a, chlorophyll b. chlorophyll c1, chlorophyll c2, chlorophyll d, and chlorophyll e.

12. The manufacturing method of claim 11, wherein a chlorophyll oxidase has been removed from the chlorophyll.

13. The manufacturing method of claim 8, wherein the step S3 further comprises following steps:
   step S31: trimming separators;
   step S32: immersing the trimmed separators into the high polymer solution;
   step S33: two separators are made by taking out two separators and placing them into an oven and baking them at a temperature of 100 degree celsius, until water evaporates;
   step S34: taking out the first of the two separators, and uniformly spraying electrolyte material thereon; and
   step S35: disposing the second of the two separators onto the first of the two separators.

14. The manufacturing method of claim 13, wherein both separators are made of high-fiber material, and the high-fiber material comprises paper material selected from the group consisting of cellophane, cotton paper, rice paper and silk paper.

15. The manufacturing method of claim 13, wherein the electrolyte material comprises a solution of organic salt or a solution of organic salt and chlorophyll, and the electric conductivity of the solution is within a range of about 10 ms/cm to about 500 ms/cm.

16. The manufacturing method of claim 15, wherein the organic salt comprises organic salt without lithium, and is selected from the group consisting of sodium iodide, sodium chloride and sodium hydroxide.

17. The manufacturing method of claim 13, wherein the step S4 further comprises following steps:
   step S41: attaching the negative-electrode structure into the housing;
   step S42: closely rolling up the separation structure by a first hollow rod;
   step S43: turning the first hollow rod with the rolled separation structure into the housing with the negative-electrode structure in clockwise direction;
   step S44: taking out the first hollow rod in counterclockwise direction to leave the separation structure in the housing with the negative-electrode structure;
   step S45: verifying whether the separation structure is attached on the negative-electrode structure in the housing; if the answer is no, performing the step S46; if the answer is yes, the manufacturing process is completed;
   step S46: polling out the separation structure and examining whether the separation structure is damaged; if the answer is on, returning to perform the step S42; and if the answer is yes, performing the step S46a;
   step S46a: replacing the separation structure and returning to perform the step S42.

18. The manufacturing method of claim 17, wherein the step S5 further comprises following steps:
   step S51: slowly filling the positive-electrode material in powder form into the housing with the negative-electrode structure and the separation structure therein;
   step S52: inserting the current collector into a center of the housing;
   step S53: tamping by the first hollow rod and a vise and continuously filling the positive-electrode material therein;
   step S54: detecting whether the amount of the positive-electrode material reaches a needed weight; if the answer is no, returning to perform the step S53; and if the answer is yes, performing the step S55; and
   step S55: embellishing the positive-electrode structure by a second hollow rod.

19. The manufacturing method of claim 18, wherein the positive-electrode material in powder form comprises the chlorophyll in powder form.

20. The manufacturing method of claim 19, wherein the positive-electrode material in powder form further comprises at least one of carbon fiber cloth, carbon powder and conductive polymeric powder, and the carbon fiber cloth and the carbon powder are selected from the group consisting of hard charcoal (or called chaoite), soot carbon, glassy carbon, carbon nanotube, activated carbon, diamond, amorphous carbon, grapheme, fullerene, graphite, carbyne, diatomic carbon, tricarbon, atomic carbon, graphitization carbon, thermolabile carbon, coke, and other allotropes of carbon.

\* \* \* \* \*